(12) United States Patent
Hattori et al.

(10) Patent No.: US 11,221,735 B2
(45) Date of Patent: Jan. 11, 2022

(54) VEHICULAR CONTROL UNIT

(71) Applicant: KYOCERA Corporation, Kyoto (JP)

(72) Inventors: Shigeto Hattori, Yokohama (JP); Kazuhiro Murakami, Machida (JP)

(73) Assignee: KYOCERA Corporation, Kyoto (JP)

( * ) Notice: Subject to any disclaimer, the term of this patent is extended or adjusted under 35 U.S.C. 154(b) by 99 days.

(21) Appl. No.: 16/078,640

(22) PCT Filed: Feb. 7, 2017

(86) PCT No.: PCT/JP2017/004444
§ 371 (c)(1),
(2) Date: Aug. 22, 2018

(87) PCT Pub. No.: WO2017/145746
PCT Pub. Date: Aug. 31, 2017

(65) Prior Publication Data
US 2019/0018556 A1     Jan. 17, 2019

(30) Foreign Application Priority Data
Feb. 23, 2016 (JP) .............................. JP2016-032324

(51) Int. Cl.
*G06F 3/0482* (2013.01)
*G06F 3/0485* (2013.01)
(Continued)

(52) U.S. Cl.
CPC ............ *G06F 3/0482* (2013.01); *B60R 11/02* (2013.01); *B60R 16/02* (2013.01); *G06F 3/0485* (2013.01); *G06F 3/0488* (2013.01); *G06F 3/04883* (2013.01); *G01C 21/3664* (2013.01); *G06F 2203/04808* (2013.01)

(58) Field of Classification Search
CPC .. G06F 3/0482; G06F 3/0488; G06F 3/04883; G06F 3/0485; G06F 2203/04808; G06F 3/03547; G06F 3/04886; G06F 3/048; B60R 16/02; B60R 11/02; B60H 1/00735; G01C 21/3664
See application file for complete search history.

(56) References Cited

U.S. PATENT DOCUMENTS 9,727,177 B2   8/2017  Tomiyasu
9,886,184 B2   2/2018  Bernstein et al.
(Continued)

FOREIGN PATENT DOCUMENTS

CN          203287883 U     11/2013
EP          2354930 A1       8/2011
(Continued)

*Primary Examiner* — Jeanette J Parker
(74) *Attorney, Agent, or Firm* — Studebaker & Brackett PC (57) ABSTRACT

A vehicular control unit includes a display configured to display a menu screen including an object for activating an application for operating an apparatus mounted on a vehicle, and a controller configured to activate the application corresponding to the object in accordance with control information acquired from a touch sensor. The controller is configured to set a first stage and a second stage threshold values that are related to data based on pressing, and switch the menu screen when the data based on pressing reaches the second stage threshold value.

8 Claims, 6 Drawing Sheets

(51) Int. Cl.
 B60R 16/02 (2006.01)
 G06F 3/0488 (2013.01)
 B60R 11/02 (2006.01)
 G01C 21/36 (2006.01)

(56) References Cited

U.S. PATENT DOCUMENTS

| | | | |
|---|---|---|---|
| 9,965,061 B2 | 5/2018 | Suzuki et al. | |
| 9,996,242 B2 | 6/2018 | Nishihashi | |
| 2013/0106756 A1* | 5/2013 | Kono | G09G 3/001 345/173 |
| 2013/0275924 A1 | 10/2013 | Weinberg et al. | |
| 2013/0335373 A1 | 12/2013 | Tomiyasu | |
| 2014/0062872 A1* | 3/2014 | Tanaka | G06F 3/03547 345/157 |
| 2014/0267066 A1* | 9/2014 | Kolehmainen | G08C 17/02 345/173 |
| 2014/0282208 A1* | 9/2014 | Chaudhri | G06F 3/04817 715/779 |
| 2014/0362014 A1 | 12/2014 | Ullrich et al. | |
| 2015/0022465 A1 | 1/2015 | Yamada | |
| 2015/0054760 A1 | 2/2015 | Amaru et al. | |
| 2015/0067495 A1 | 3/2015 | Bernstein et al. | |
| 2015/0067586 A1* | 3/2015 | Nishihashi | G06F 3/0488 715/786 |
| 2016/0062635 A1* | 3/2016 | Feit | G06F 3/1454 715/765 |
| 2016/0139798 A1* | 5/2016 | Takikawa | G06F 3/0482 345/173 |
| 2016/0259517 A1* | 9/2016 | Butcher | G06F 3/0482 |
| 2017/0024023 A1 | 1/2017 | Suzuki et al. | |
| 2018/0188920 A1 | 7/2018 | Bernstein et al. | |

FOREIGN PATENT DOCUMENTS

| | | |
|---|---|---|
| JP | 2002-012091 A | 1/2002 |
| JP | 2013-210963 A | 10/2013 |
| JP | 2013-218570 A | 10/2013 |
| JP | 2014-046867 A | 3/2014 |
| JP | 2015-022766 A | 2/2015 |
| JP | 2015-114936 A | 6/2015 |
| WO | 2012/114760 A1 | 8/2012 |
| WO | 2013/169299 A1 | 11/2013 |
| WO | 2013169854 A2 | 11/2013 |
| WO | 2015/083267 A1 | 6/2015 |
| WO | 2015155973 A1 | 10/2015 |

* cited by examiner

VEHICULAR CONTROL UNIT

CROSS-REFERENCE TO RELATED APPLICATION

This application claims priority to and the benefit of Japanese Patent Application No. 2016-032324 filed Feb. 23, 2016, the entire contents of which are incorporated herein by reference.

TECHNICAL FIELD

The present disclosure relates to a vehicular control unit.

BACKGROUND

A vehicle is provided with an operation unit for a driver to operate apparatuses mounted on the vehicle (hereinafter, also referred to as "vehicle mounted apparatuses"). The operation unit is provided on or near a center console. When the driver views the operation unit provided near the center console in order to operate the vehicle mounted apparatus, the driver sometimes turns their line of sight away from the forward direction while driving.

SUMMARY

A vehicle control unit according to a first embodiment of the present disclosure includes a touch sensor, and a pressing detector for detecting pressing against the touch sensor. The vehicular control unit also includes a display configured to display a menu screen including an object for activating an application for operating an apparatus mounted on a vehicle. The vehicular control unit further includes a controller configured to activate the application corresponding to the object in accordance with control information acquired from the touch sensor and data based on pressing acquired from the pressing detector. The controller is configured to set a first stage threshold value and a second stage threshold value larger than the first stage threshold value, which are related to the data based on pressing. The controller is configured to switch the menu screen when the data based on pressing reaches the second stage threshold value.

A vehicular control unit according to a second embodiment of the present disclosure includes a touch sensor. The vehicular control unit also includes a display configured to display a menu screen including an object for activating an application for operating an apparatus mounted on a vehicle. The vehicular control unit further includes a controller configured to activate the application corresponding to the object in accordance with control information acquired from the touch sensor. The controller is configured to switch the menu screen when the control information is a slide input including a predetermined gesture.

A vehicular control unit according to a third embodiment of the present disclosure includes a touch sensor, and a pressing detector for detecting pressing against the touch sensor. The vehicular control unit also includes a display configured to display either a menu screen including an object for activating an application for operating an apparatus mounted on a vehicle, or an operation screen of an activated application. The vehicular control unit further includes a controller configured to activate the application corresponding to the object in accordance with control information acquired from the touch sensor and data based on pressing acquired from the pressing detector. The controller is configured to set a first stage threshold value and a second stage threshold value larger than the first stage threshold value, which are related to the data based on pressing. The controller is configured to switch from the activated application to another application when the data based on pressing reaches the second stage threshold value.

A vehicular control unit according to a fourth embodiment of the present disclosure includes a touch sensor. The vehicular control unit also includes a display configured to display either a menu screen including an object for activating an application for operating an apparatus mounted on a vehicle, or an operation screen of an activated application. The vehicular control unit further includes a controller configured to activate the application corresponding to the object in accordance with control information acquired from the touch sensor. The controller is configured to switch from the activated application to another application when the control information is a slide input including a predetermined gesture.

DETAILED DESCRIPTION (Embodiment) A vehicular control unit according to the present embodiment may be a vehicle mounted apparatus.

Figure 1:
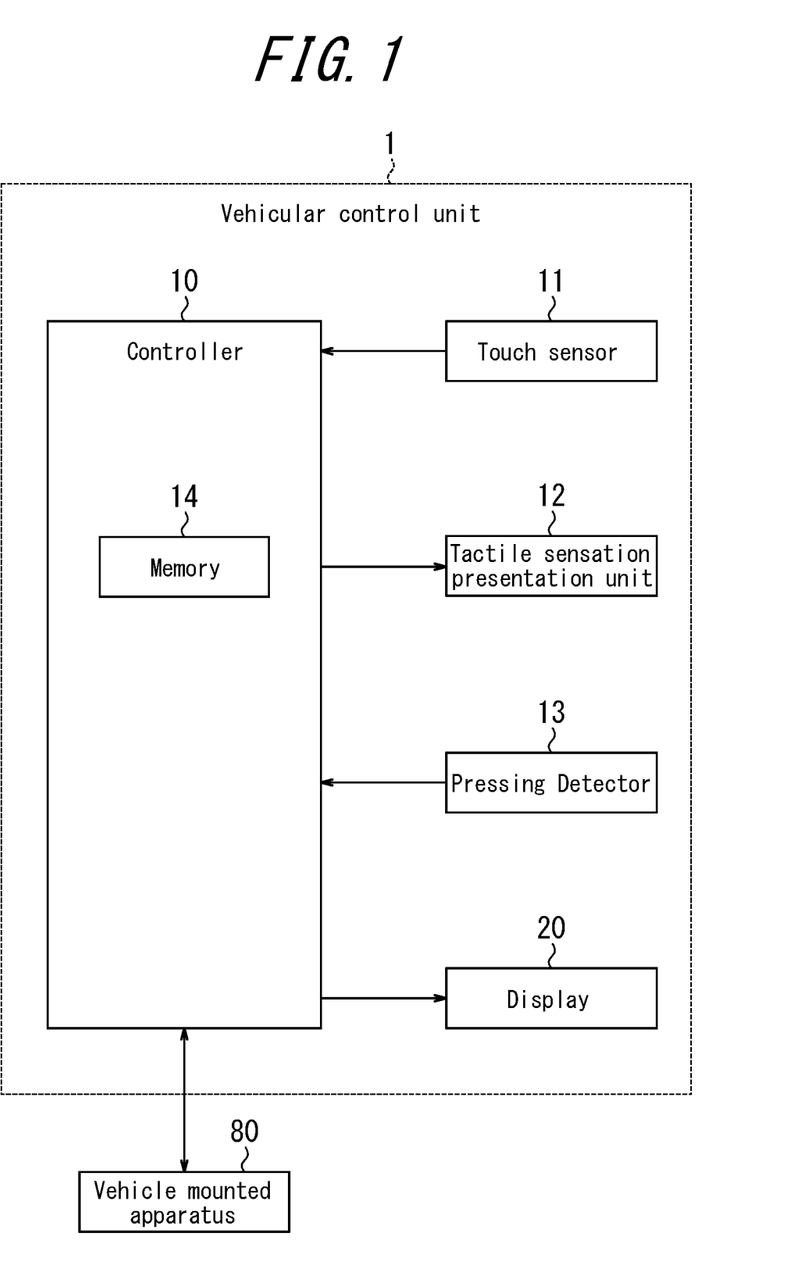
FIG. 1 is a functional block diagram illustrating a schematic configuration example of a vehicular control unit according to an embodiment.

[Unit Configuration] As illustrated in FIG. 1, a vehicular control unit 1 includes a controller 10, a touch sensor 11, a tactile sensation presentation unit 12, a pressing detector 13, and a display 20.

The controller 10 is respectively connected to the touch sensor 11, the tactile sensation presentation unit 12, the pressing detector 13, and the display 20. The controller 10 is configured to output a signal or information associated with a signal to each of the connected units. Information associated with a signal is also referred to as control information. The controller 10 is configured to acquire control information from each of the connected units. In FIG. 1, each arrow connecting the controller 10 and the respective unit indicates the main direction in which control information is outputted. For example, the controller 10 and the touch sensor 11 are connected by an arrow directed from the touch sensor 11 to the controller 10. In this case, it indicates that control information is mainly outputted from the touch sensor 11 to the controller 10.

The controller 10 includes a memory 14. The memory 14 may be constituted by a semiconductor memory or the like. In the memory 14, various kinds of information, a program for operating the vehicular control unit 1, or the like is stored. The memory 14 may function as a working memory.

The controller 10 is configured to store control information in the memory 14, and acquire control information from the memory 14. The controller 10 is configured to control each of the connected units in accordance with control information.

The controller 10 is connected to apparatuses mounted on the vehicle. The apparatuses mounted on the vehicle are also referred to as vehicle mounted apparatuses 80. The controller 10 is configured to output control information for operating the vehicle mounted apparatuses 80 in response to input to the touch sensor 11. Control information for operating the vehicle mounted apparatuses 80 is also referred to as apparatus operation information. The controller 10 is configured to acquire control information indicating the state of the vehicle mounted apparatuses 80.

In order to operate the vehicle mounted apparatuses 80, the controller 10 is configured to execute applications for operating the vehicle mounted apparatuses 80. The applications for operating the vehicle mounted apparatuses 80 are also simply referred to as applications. The controller 10 is configured to generate apparatus operation information in response to a user's input to an application. The controller 10 is configured to output apparatus operation information to the vehicle mounted apparatuses 80. The vehicle mounted apparatuses 80 are configured to operate based on the apparatus operation information acquired from the controller 10. As to the vehicle mounted apparatuses 80 operated by the applications, various kinds are applicable. For example, the vehicle mounted apparatuses 80 may include a car navigation system, an air conditioner, an audio, a television, and a communication apparatus. Details of the applications will be described later.

The touch sensor 11 is for detecting touch by an object such as a finger or a stylus on the touch sensor 11. In the following description, it is assumed that the touch sensor 11 is touched with a finger, however, it makes no difference when the touch sensor 11 is touched with an object such as a stylus. As a method for the touch sensor 11 to detect a touch, any method such as an electrostatic capacitance method, a resistive film method, a surface acoustic wave method or an ultrasonic method, an infrared method, an electromagnetic induction method, a load detection method, or the like can be used.

When the touch sensor 11 detects a finger touch, it acquires the coordinates of the touched position. The touch sensor 11 then outputs the coordinates of the touched position as control information to the controller 10. The user can make an input corresponding to the touched position by touching the touch sensor 11 with a finger. In addition, by sliding the finger touching the touch sensor 11, the user can input a pattern such as a character or a figure corresponding to the slide path.

The tactile sensation presentation unit 12 is configured to present tactile sensation to the user's finger touching the touch sensor 11 by generating vibrations of various patterns according to a drive signal acquired from the controller 10. That is, the controller 10 outputs a drive signal as control information to the tactile sensation presentation unit 12, to thereby start driving of the tactile sensation presentation unit 12.

The tactile sensation presentation unit 12 is constituted by a piezoelectric element, an ultrasonic vibrator, a vibration motor or an eccentric motor, or the like. For example, the tactile sensation presentation unit 12 generates a vibration based on a vibration pattern corresponding to a click feeling, a material texture, or the like, and presents the tactile sensation such as a click feeling, a material texture, or the like to the user's finger touching the touch sensor 11.

The pressing detector 13 is configured to detect pressure generated by the user touching the touch sensor 11 with a finger, a stylus, or the like and further pressing the touch sensor 11. Pressure generated by pushing the touch sensor 11 is also referred to as pressing. The pressing detector 13 is configured to output data based on pressing as control information to the controller 10.

The pressing detector 13 may be constituted by a strain gage sensor, a piezoelectric element or the like, whose physical or electrical characteristics such as strain, resistance, or voltage change according to pressing. For example, when the pressing detector 13 is constituted by a piezoelectric element, the voltage value of the piezoelectric element, which is an electrical characteristic, varies according to the magnitude of the load caused by pressing against the touch sensor 11. The voltage value which is an electrical characteristic is included in data based on pressing. The data based on pressing may not only include the voltage value, but also include the magnitude of the load caused by pressing, the resistance value, and the like.

The pressing detector 13 may be constituted in accordance with the detection method of the touch sensor 11. For example, when the detection method of the touch sensor 11 is a resistive film method, the magnitude of resistance according to the size of contact area can be associated with the pressing load on the touch sensor 11. When the touch sensor 11 uses an electrostatic capacitance method, the capacitance size can be associated with the pressing load on the touch sensor 11. With such a configuration, the pressing detector 13 can be constituted without using a strain gage sensor, a piezoelectric element or the like.

The controller 10 may determine an input to the operation object at the touched position when the data based on pressing acquired from the pressing detector 13 is equal to or larger than a predetermined threshold value. Here, data based on pressing equal to or larger than a predetermined threshold value corresponds to pressing equal to or higher than a predetermined pressure. An input determined when data based on pressing is equal to or larger than a predetermined threshold value, namely, when pressing is equal to or higher than a predetermined pressure is also referred to as a pressing input.

The controller 10 may set multistage threshold values with respect to the magnitude of pressing. For example, the controller 10 may set a first stage threshold value and a second stage threshold value. In the case in which a first stage threshold value and a second stage threshold value are set, the controller 10 is configured to determine whether data based on pressing acquired from the pressing detector 13 has reached the first stage threshold value and the second stage threshold value. The controller 10 executes different control according to the determination result. The second stage threshold value is assumed to be higher than the first stage threshold value. An input when data based on pressing reaches the first stage threshold value and an input when data based on pressing reaches the second stage threshold value are also respectively referred to as a first stage pressing input and a second stage pressing input. In the above description, two threshold value stages are set, however, three or more threshold value stages may be set.

The tactile sensation presentation unit 12 and the pressing detector 13 may be integrated. When both the tactile sensation presentation unit 12 and the pressing detector 13 are constituted using a piezoelectric element, these can share a piezoelectric element. This is because a piezoelectric element generates a voltage when pressure is applied and deforms when a voltage is applied thereto.

The display 20 is configured to display characters, images or the like that can be visually recognized by the user, based on control information acquired from the controller 10. The display 20 may be a head-up display. A head-up display is also referred to as a HUD. The HUD is configured to project an image on the front wind shield 82 of the vehicle (see FIG. 2), and cause the user to visually recognize reflected light of the projected image as a virtual image.

The display 20 may be a liquid crystal display, an organic or inorganic EL (Electro-Luminescence) display, or the like. A liquid crystal display is also referred to as a LCD. The display 20 may be provided on the upper part of the center console of the vehicle such that, as far as possible, the user does not need to move the line of sight from the vehicle forward direction while driving the vehicle. Note that the display 20 is not limited to the above configuration.

Figure 2:
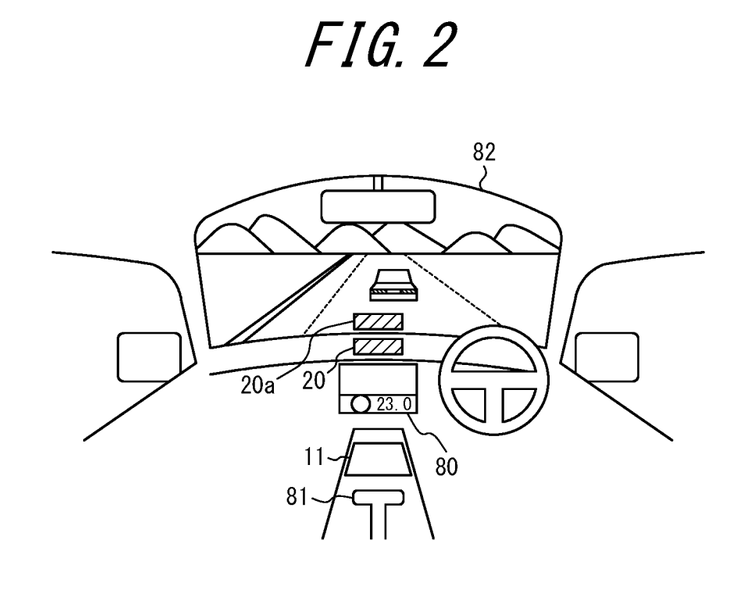
FIG. 2 is an arrangement example of a vehicle mounted apparatus and a touch sensor on a center console.

As illustrated in FIG. 2, the touch sensor 11 is disposed between the vehicle mounted apparatus 80 and the shift lever 81. In FIG. 2, a HUD is disposed as the display 20. The display 20 is disposed on the dashboard such that a display surface 20a is formed at the center of the lower part of the front wind shield 82. The display surface 20a is visually recognized by the driver as a virtual image of the image projected from the display 20.

The display surface 20a is formed on the extended line of the traveling direction of the vehicle from the touch sensor 11. With such a configuration, the user can easily operate the touch sensor 11 by blind touching the touch sensor 11 while visually recognizing the display surface 20a without turning their line of sight away from the vehicle forward direction.

[Application] The controller 10 of the vehicular control unit 1 according to the present embodiment is configured to execute applications for operating the vehicle mounted apparatuses 80. Each vehicle mounted apparatus 80 is associated with an application for operating it. For example, when the user operates an air conditioner as a vehicle mounted apparatus 80, the controller 10 activates an application corresponding to the air conditioner.

<Activation of Applications> The vehicular control unit 1 includes a menu for selecting and activating an application corresponding to the vehicle mounted apparatus 80 that the user intends to operate. The menu includes, for example, objects for activating applications for operating a car navigation system, an air conditioner and the like. When the user makes a pressing input and selects an object, the controller 10 activates an application corresponding to the object.

The objects are associated with predetermined positions on the touch sensor 11 such that the user can select by pressing input. That is, when a pressing input is made at a predetermined position on the touch sensor 11, an object associated with the predetermined position is selected. The correspondence relationship between the objects and the touch sensor 11 is set by the controller 10.

The controller 10 is configured to cause the display 20 to display the correspondence relationship between the objects and the touch sensor 11 on the display surface 20a. The display 20 is configured to display such that the shape of the display surface 20a is similar to that of the touch sensor 11. In the present embodiment, the shape of the touch sensor 11 and the display surface 20a is assumed to be a rectangle. Note that the touch sensor 11 and the display surface 20a are not limited to a rectangle and may have other shapes. When an object is associated with the upper left of the touch sensor 11, the display 20 displays the object on the upper left of the display surface 20a. That is, the display 20 is configured to display on the display surface 20a a menu screen in which objects associated with applications are arranged so as to correspond to the positions on the touch sensor 11. By associating the positions on the touch sensor 11 with the display positions of the objects, the user can know the correspondence relationship between the objects and the touch sensor 11.

In the menu screen according to the present embodiment, it is assumed that the number of objects simultaneously associated with the touch sensor 11, namely, the number of objects simultaneously displayed on the display surface 20a is four. It is further assumed that the four objects are respectively associated with predetermined positions provided near the four corners of the touch sensor 11. Note that the number of objects simultaneously associated with the touch sensor 11 is not limited to four, and may be three or less, or five or more.

Figure 3:
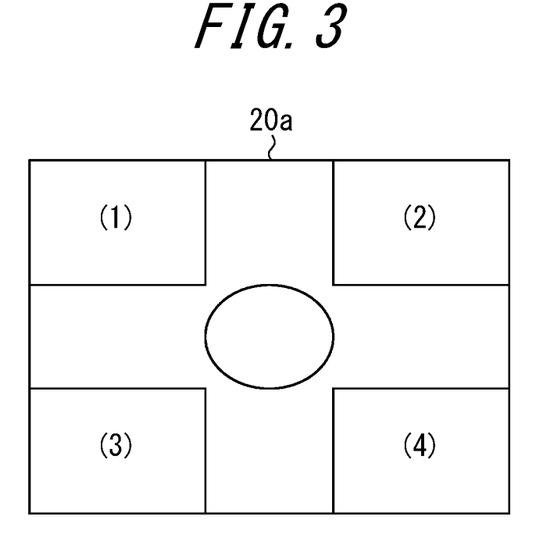
FIG. 3 is an example of a first menu screen.

As illustrated in FIG. 3, the display 20 may display four objects (1) to (4) on the display surface 20a. The object (1) is associated with the upper left area of the touch sensor 11. In addition, the objects (2) to (4) are respectively associated with the upper right area, the lower left area, and the lower right area of the touch sensor 11. Although no object is displayed at the center of the display surface 20a, note that this is not necessary. For example, an object associated with the central area of the touch sensor 11 may be displayed in the central ellipse area.

The controller 10 is configured to, based on control information acquired from the touch sensor 11 and the pressing detector 13, determine whether a pressing input is made at a position associated with an object, namely, whether an object is selected. When an object is selected, the controller 10 activates an application corresponding to the object. For example, in the case in which the object (1) is associated with an application for operating a car navigation system, the controller 10 activates the application for operating a car navigation system in response to the selection of the object (1).

<Switching of Menu Screens> In the example illustrated in FIG. 3, the number of objects to be displayed is four. When the vehicular control unit 1 is capable of operating five or more vehicle mounted apparatuses 80, applications that can be activated by the displayed objects are limited to the applications corresponding to the first to fourth vehicle mounted apparatuses 80. That is, in the example illustrated in FIG. 3, the display 20 cannot display on the display surface 20a the object for activating the application corresponding to the fifth vehicle mounted apparatus 80. In order to display objects for activating applications corresponding to the fifth and subsequent vehicle mounted apparatuses 80, the controller 10 is configured to switch the menu screen. The menu screen illustrated in FIG. 3 is also referred to as a first menu screen. The menu screen switched from the first menu screen by the controller 10 is also referred to as a second menu screen.

Figure 4:
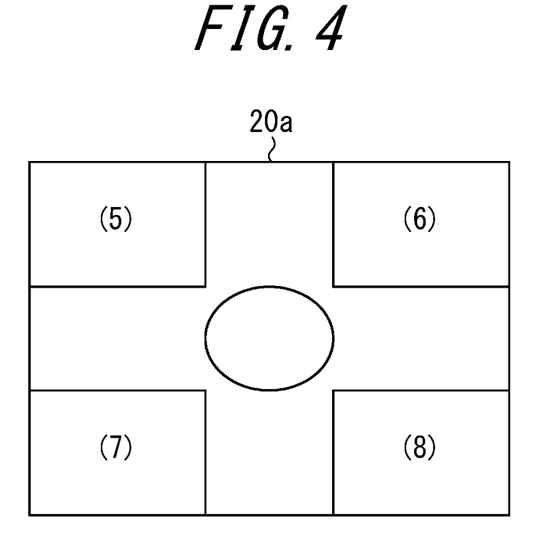
FIG. 4 is an example of a second menu screen.

As illustrated in FIG. 4, four objects (5) to (8) are displayed on the display surface 20a by the display 20. In this case, the object (5) is associated with the upper left area of the touch sensor 11. In addition, the objects (6) to (8) are respectively associated with the upper right area, the lower left area, and the lower right area of the touch sensor 11. The description of the central area of the display surface 20a will be omitted for being similar to that described in relation to FIG. 3.

The controller 10 is configured to switch a menu screen in response to an input to the touch sensor 11. For example, the controller 10 may provide an object configured to execute menu switching on the menu screen. The controller 10 may switch the menu screen in response to a pressing input to the object configured to execute menu switching.

In the state in which a menu screen is displayed on the display surface 20a, the controller 10 may switch the menu screen when a second stage pressing input is made. In this case, an input to select an object may be set as a first stage pressing input. With such a configuration, it is possible to switch a menu screen without selecting an object, regardless of the position on the touch sensor 11 at which a second stage pressing input is made.

In the case in which a menu screen is switched in response to a second stage pressing input, a condition may be further added that the second stage pressing input is executed while touching at least two points. For example, by making a second stage pressing input with two fingers, the second stage pressing input can be executed while touching two points. With such a configuration, unintended switching of the menu screen by the user can be reduced.

In the state in which a menu screen is displayed on the display surface 20a, the controller 10 may switch the menu screen when a slide input including a predetermined gesture is made to the touch sensor 11. A slide input including a predetermined gesture is also referred to as a gesture input. The predetermined gesture may be, for example, a swipe input that simply slides in one direction. The predetermined gesture may represent a specific character such as Z, V, O, N or the like, according to the path of the slide. The predetermined gesture may represent a specific figure such as a triangle, a square, a star or the like, according to the path of the slide.

In the case in which a menu screen is switched in response to a gesture input, a condition may be further added that the gesture input is executed while touching at least two points. For example, by executing a slide input while touching with two fingers, a gesture input can be executed while touching two points. With such a configuration, switching of menu screen unintended by the user can be reduced.

By switching a menu screen in the above described way, the user can switch a menu screen without viewing the touch sensor 11, namely, without turning their line of sight away from the vehicle forward direction. As a result, the driving of the vehicle can be performed safely.

Figure 5:
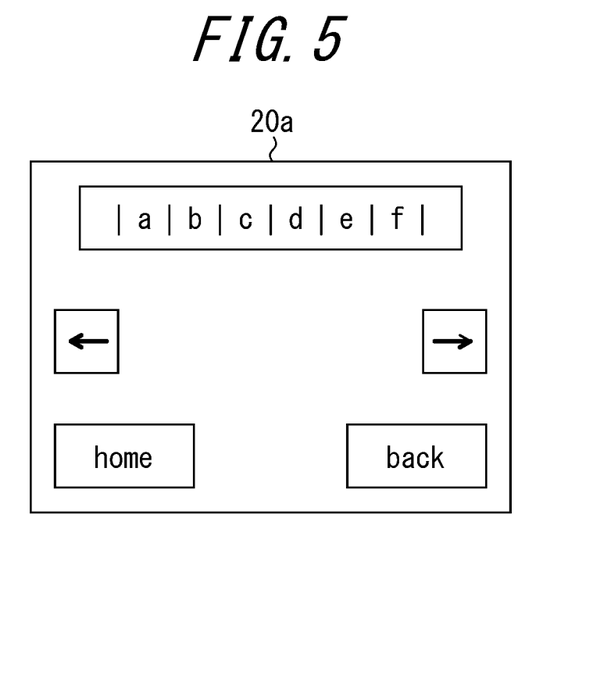
FIG. 5 is an example of an application operation screen.

<Switching of Applications> When an application for operating one vehicle mounted apparatus 80 is activated by the vehicular control unit 1, the user may want to operate another vehicle mounted apparatus 80. In this case, it is possible to operate another vehicle mounted apparatus 80 by switching the application. As one method of switching an application, an object for an operation of returning to the menu screen may be provided in the application. For example, as illustrated in FIG. 5, an object indicated as "home" may be provided. The controller 10 may switch to the menu screen in response to an input to the object indicated as "home". The user may return to the menu screen once by selecting the object indicated as "home", and then select another object on the menu screen to activate another application corresponding to another vehicle mounted apparatus 80.

As another method of switching an application, the controller 10 may switch directly to another application during application startup. The controller 10 may switch an application in response to an input to the touch sensor 11. With such a configuration, the user can switch an application more speedily without returning to the menu screen.

In a state in which the operation screen of an application is displayed on the display surface 20a, the controller 10 may switch the application when a second stage pressing input is made. In this case, an input to select an object on the operation screen of an application may be set as a first stage pressing input. With such a configuration, the user can switch an application without selecting an object, regardless of the position on the touch sensor 11 at which a second stage pressing input is made.

In the case in which an application is switched in response to a second stage pressing input, a condition may be further added that the second stage pressing input is executed while touching at least two points. For example, by executing a second stage pressing input with two fingers, the second stage pressing input can be executed while touching two points. With such a configuration, unintended switching of an application can be reduced.

Figure 6:
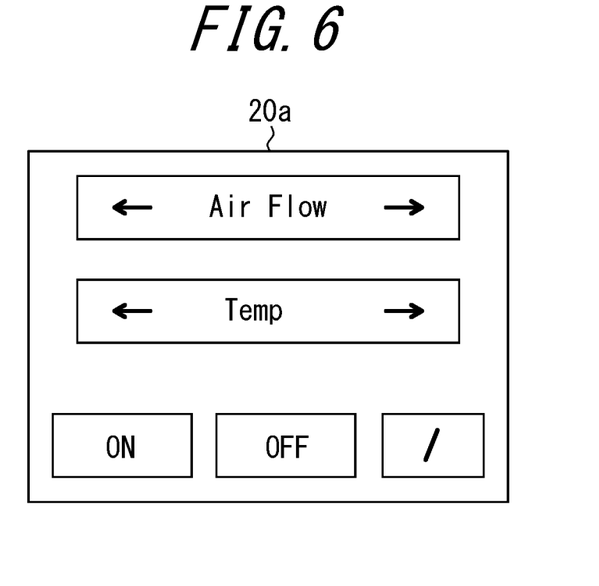
FIG. 6 is an example of an application operation screen.

The operation screen of an application illustrated in FIG. 6 includes an object indicated as "Air Flow" for air volume setting of an air conditioner. The operation screen also includes an object indicated as "Temp" for temperature setting of the air conditioner. The operation screen further includes objects indicated as "ON" and "OFF" for setting on/off of the air conditioner. In FIG. 6, irrespective of the presence or absence of the objects, the application can be switched regardless of the position on the touch sensor 11 at which a second stage pressing input is made. For example, the application may be switched between that illustrated in FIG. 5 and that illustrated in FIG. 6. Also, the application may be sequentially switched to another application.

In the state in which the operation screen of an application is displayed on the display surface 20a, the controller 10 may switch the application when a slide input to the touch sensor 11 including a predetermined gesture is made. Description of the predetermined gesture will be omitted for being similar to that related to switching of menu screen described above.

In the case in which an application is switched in response to a gesture input, a condition may be further added that the gesture input is executed while touching at least two points. For example, by executing an input that slides while touching with two fingers, a gesture input can be executed while touching two points. With such a configuration, unintended switching of application can be reduced.

By switching an application in the above described way, the user can switch an application without viewing the touch sensor 11, namely, without turning their line of sight away from the vehicle forward direction. As a result, the driving of the vehicle can be performed safely. In addition, the user can switch an application without returning to the menu screen. As a result, operational comfort can be improved.

Figure 7:
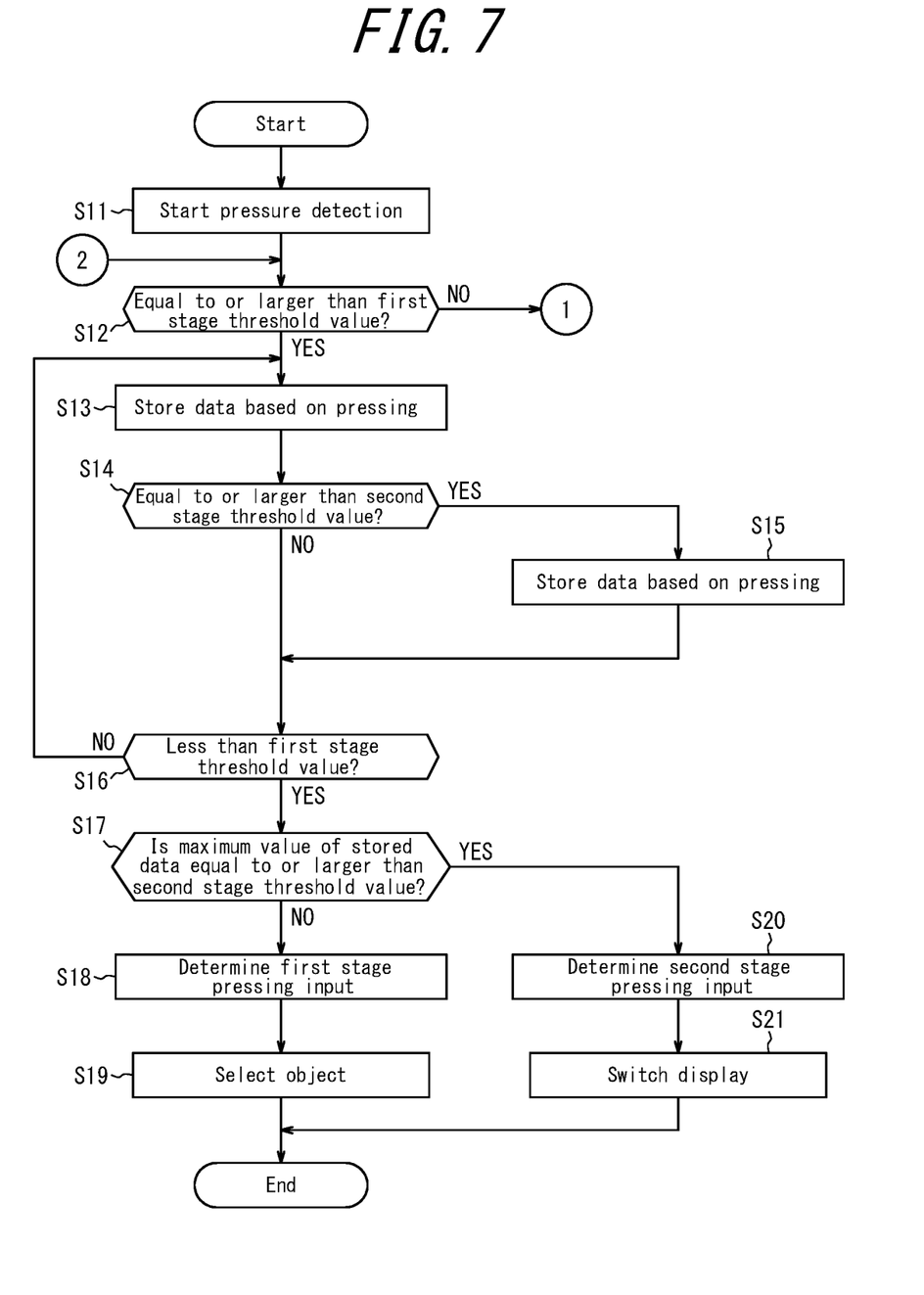
FIG. 7 is a flowchart illustrating an example of a control method for detecting a pressing input.
Figure 8:
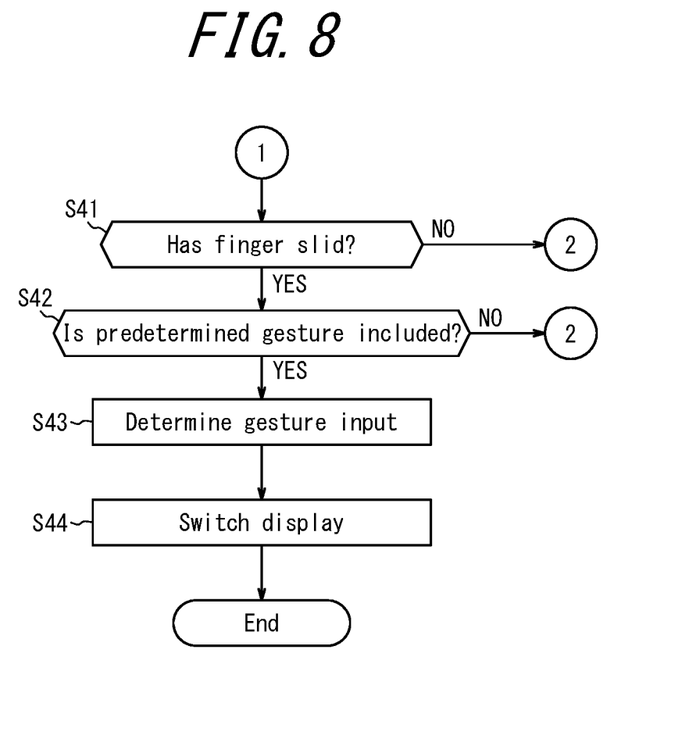
FIG. 8 is a flowchart illustrating an example of a control method for detecting a gesture input.

[Flowchart] The controller 10 may execute the control method illustrated in FIGS. 7 and 8.

<Pressing Input> The controller 10 causes the pressing detector 13 to start detection of pressure (Step S11 in FIG. 7).

Then, the controller 10 acquires data based on pressing from the pressing detector 13, and determines whether the data based on pressing is equal to or larger than the first stage threshold value (Step S12).

When the data based on pressing is not equal to or larger than the first stage threshold value (Step S12: NO), the controller 10 proceeds to Step S41 of FIG. 8.

On the other hand, when the data based on pressing is equal to or larger than the first stage threshold value (Step S12: YES), the controller 10 stores the data based on pressing in the memory 14 (Step S13). The controller 10 may cause the tactile sensation presentation unit 12 to present the user with a tactile sensation such as a click feeling corresponding to the first stage pressing input at the time when the data based on pressing is determined to be equal to or larger than the first stage threshold value.

The controller 10 acquires data based on pressing from the pressing detector 13, and determines whether the data based on pressing is equal to or larger than the second stage threshold value (Step S14).

When the data based on pressing is equal to or larger than the second stage threshold value (Step S14: YES), the controller 10 stores the data based on pressing in the memory 14 (Step S15). The controller 10 may cause the tactile sensation presentation unit 12 to present the user with a tactile sensation such as a click feeling corresponding to the second stage pressing input at the time when the data based on pressing is determined to be equal to or larger than the second stage threshold value.

On the other hand, when the data based on pressing is not equal to or larger than the second stage threshold value(Step S14: NO), the controller 10 acquires data based on pressing from the pressing detector 13 and determines whether the data based on pressing is smaller than the first stage threshold value (Step S16). When the data based on pressing is not smaller than the first stage threshold value (Step S17: NO), the controller 10 returns to Step S13.

When the data based on pressing is smaller than the first stage threshold value (Step S16: YES), the controller 10 determines whether the maximum value of the data based on pressing stored in the memory 14 is equal to or larger than the second stage threshold value (Step S17).

When the maximum value of the data based on pressing is not equal to or larger than the second stage threshold value (Step S17: NO), the controller 10 determines that a first stage pressing input has been made (Step S18).

Then, the controller 10 selects the object associated with the position at which the first stage pressing input was made (Step S19). When a menu screen is displayed on the display surface 20a, the controller 10 activates the application corresponding to the object. When the operation screen of an activated application is displayed on the display surface 20a, the controller 10 outputs apparatus operation information corresponding to the object to the vehicle mounted apparatus 80. Then, the controller 10 ends the processing of the flowchart illustrated in FIG. 7.

On the other hand, when the data based on pressing is equal to or larger than the second stage threshold value (Step S17: YES), the controller 10 determines that a second stage pressing input has been made (Step S20).

When a menu screen is displayed on the display surface 20a, the controller 10 switches the menu screen (Step S21). When the operation screen of an activated application is displayed on the display surface 20a, the controller 10 switches the application. Then, the controller 10 ends the processing of the flowchart illustrated in FIG. 7.

In the processing illustrated in the flowchart of FIG. 7, the first stage pressing input and the second stage pressing input are determined after the data based on pressing is determined to be smaller than the first stage threshold value. With such a configuration, it is possible to cope with multistage inputs of the third or more stages. On the other hand, if the controller 10 is configured to not accept a pressing input of the third or more stages, the controller 10 may determine the second stage pressing input at the time when the data based on pressing is determined to be equal to or larger than the second stage threshold value. With such a configuration, operability can be improved.

After the data based on pressing is determined to be equal to or larger than the first stage threshold value, the controller 10 may determine the first stage pressing input when the state in which the data based on pressing is equal to or larger than the first stage threshold value and smaller than the second stage threshold value has lasted for a predetermined time.

<Gesture Input> In Step S12 of FIG. 7, when the data based on pressing is not equal to or larger than the first stage threshold value (Step S12 of FIG. 7: NO), the controller 10 proceeds to Step S41 of FIG. 8. The controller 10 determines whether the finger touching the touch sensor 11 has slid (Step S41 of FIG. 8). When the finger has not slid (Step S41: NO), the controller 10 returns to Step S12 of FIG. 7.

On the other hand, when the finger has slid (Step S41: YES), the controller 10 determines whether the slide input includes a predetermined gesture (Step S42). When the slide input does not include a predetermined gesture (Step S42: NO), the controller 10 returns to Step S12 of FIG. 7.

On the other hand, when the slide input includes a predetermined gesture (Step S42: YES), the controller 10 determines that a gesture input has been made (Step S43). At this time, the controller 10 may cause the tactile sensation presentation unit 12 to present a tactile sensation such as a click feeling corresponding to the gesture input.

When a menu screen is displayed on the display surface 20a, the controller 10 switches the menu screen. When the operation screen of an application is displayed on the display surface 20a, the controller 10 switches the application. Then, the controller 10 ends the processing of the flowchart illustrated in FIG. 8.

By executing the control method illustrated in the flowcharts of FIGS. 7 and 8, the user can switch an application without viewing the touch sensor 11, namely, without turning their line of sight away from the vehicle forward direction.

In the flowcharts of FIGS. 7 and 8, switching of menu screen and application is executed by pressing input and gesture input. Switching may be executed by one of pressing input and gesture input.

According to the vehicular control unit 1 of the present embodiment, the user can switch an application without viewing the touch sensor 11, namely, without turning their line of sight away from the vehicle forward direction. As a result, driving of the vehicle can be performed safely. Further, the user can switch an application without returning to the menu screen. As a result, operational comfort can be improved.

Although an embodiment according to the present disclosure has been described based on the accompanying drawings and examples, it is to be noted that various changes and modifications will be apparent to those skilled in the art based on this disclosure. Thus, such changes and modifications are to be understood as included within the scope of this disclosure. For example, functions and the like included in various components and steps may be reordered in any logically consistent way. Furthermore, components or steps may be combined into one or divided. Although an embodiment according to the present disclosure has been described centering on an apparatus, it is to be noted that embodiments according to the present disclosure may be realized as a method including steps executed by each component of an apparatus. Further, although an embodiment according to the present disclosure has been described centering on an apparatus, it is to be noted that embodiments according to the present disclosure may be realized as a method executed by a processor included in an apparatus, or as a program or a storage medium recording a program. It is to be understood that there are also included within the scope of the present disclosure.

The invention claimed is:

1. A vehicular control unit, comprising:
   a touch sensor;
   a pressing detector for detecting pressing against the touch sensor;
   a display configured to display a menu screen including an object for activating an application for operating an apparatus mounted on a vehicle; and
   a processor configured to,
   activate the application corresponding to the object in accordance with control information acquired from the touch sensor and data based on the pressing acquired from the pressing detector,
   set a first stage threshold value and a second stage threshold value larger than the first stage threshold value, which are related to the data based on the pressing,
   when the data based on the pressing reaches the first stage threshold value, generate a first tactile sensation,
   when the control information is a slide input including a predetermined gesture and is acquired while displaying the menu screen, switch the menu screen,
   when the control information is the slide input and is acquired while displaying the activated application, switch from the activated application to another application, and
   when the data based on the pressing reaches the second stage threshold while displaying the activated application, switch from the activated application to another application and generate a second tactile sensation,
   wherein the processor is configured to switch the menu screen when the data based on the pressing is less than the first stage threshold value and the control information is the slide input including the predetermined gesture and is acquired while displaying the menu screen, and
   the processor is configured to switch from the activated application to the another application when the data based on the pressing is less than the first stage threshold value and the control information is the slide input and is acquired while displaying the activated application.

2. The vehicular control unit according to claim 1, wherein
   the processor is configured to switch the menu screen when at least two touch points are detected.

3. The vehicular control unit according to claim 1, wherein the processor is further configured to refrain from displaying the menu screen while switching from the activated application to the another application.

4. The vehicular control unit according to claim 1, wherein the processor is further configured to select the another application from a sequence of applications.

5. A vehicular control unit, comprising:
   a touch sensor;
   a pressing detector for detecting pressing against the touch sensor;
   a display configured to display either a menu screen including an object for activating an application for operating an apparatus mounted on a vehicle, or an operation screen of an activated application; and
   a processor configured to,
   activate the application corresponding to the object in accordance with control information acquired from the touch sensor and data based on the pressing acquired from the pressing detector,
   set a first stage threshold value and a second stage threshold value larger than the first stage threshold value, which are related to the data based on the pressing,
   when the data based on the pressing reaches the first stage threshold value, generate a first tactile sensation,
   switch from the activated application to another application when the control information is a slide input including a predetermined gesture, and
   when the data based on the pressing reaches the second stage threshold while displaying the activated application, switch from the activated application to another application and generate a second tactile sensation,
   wherein the processor is configured to switch from the activated application to the another application when the data based on the pressing is less than the first stage threshold value and the control information is the slide input including the predetermined gesture.

6. The vehicular control unit according to claim 5, wherein
   the processor is configured to switch from the activated application to another application when at least two touch points are detected.

7. The vehicular control unit according to claim 5, wherein the processor is further configured to refrain from displaying the menu screen while switching from the activated application to the another application.

8. The vehicular control unit according to claim 5, wherein the processor is further configured to select the another application from a sequence of applications.

* * * * *